(12) United States Patent
Shibata et al.

(10) Patent No.: US 6,692,407 B2
(45) Date of Patent: Feb. 17, 2004

(54) VEHICLE ENGINE CONTROLLER

(75) Inventors: Noboru Shibata, Anjo (JP); Mitsuhiro Nakamura, Anjo (JP); Hideaki Ogasawara, Anjo (JP); Mamoru Kurosawa, Anjo (JP); Kazuyuki Watanabe, Toyota (JP); Naoyuki Sakamoto, Toyota (JP); Toshimitsu Sato, Toyota (JP); Atsushi Ayabe, Toyota (JP); Hiromichi Kimura, Toyota (JP)

(73) Assignees: Aisin AW,Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/207,092

(22) Filed: Jul. 30, 2002

(65) Prior Publication Data

US 2003/0027686 A1 Feb. 6, 2003

(30) Foreign Application Priority Data

Aug. 1, 2001 (JP) ........................ 2001-233985

(51) Int. Cl.⁷ .............................................. B60K 41/04
(52) U.S. Cl. ....................................... 477/110; 477/905
(58) Field of Search ................................ 477/107, 108, 477/110, 111, 905

(56) References Cited

U.S. PATENT DOCUMENTS 5,092,199 A * 3/1992 Goto et al. ................ 477/133
5,393,278 A * 2/1995 Kyushima et al. ...... 477/905 X
5,800,309 A * 9/1998 Takiguchi et al. .......... 477/144
6,254,508 B1 * 7/2001 Kojima et al. .............. 477/109
6,264,580 B1 * 7/2001 Tabata et al. ............... 477/149

FOREIGN PATENT DOCUMENTS

JP    402046359    * 2/1990   .................. 477/156
JP    404307171    * 10/1992  .................. 477/140
JP    B2 7-59904     6/1995

* cited by examiner

Primary Examiner—Ha Ho
(74) Attorney, Agent, or Firm—Oliff & Berridge, PLC

(57) ABSTRACT

An engine controller for a vehicle having an engine and an automatic transmission, the automatic transmission controlling the engine during a coast-down to a predetermined gear stage, the engine controller having an engine speed detection unit that detects the number of rotations of the engine output shaft an input shaft speed detection unit that detects the number of rotations of the input shaft a power-on detection unit for detecting a power-on state caused by a driver an engine output control unit that controls the output of the engine; and an engine control unit determines an engine speed and an input shaft speed and outputs a signal to the engine output control unit such that a predetermined relationship is maintained between the engine speed and the input shaft speed when the power-on state is detected in the coast-down state.

33 Claims, 8 Drawing Sheets

VEHICLE ENGINE CONTROLLER

BACKGROUND OF THE INVENTION

1. Field of Invention

The invention relates to an apparatus for controlling a driving force from a driving source, such as an engine of a vehicle having an automatic transmission.

2. Description of Related Art

A driver may apply pressure to the acceleration pedal to power on the engine when the transmission is shifted down based on a reduction of the vehicle speed as a result of a coasting down or a power-off. In this case, in the coast-down shift, the hydraulic pressure of a clutch for a high speed stage is released (released side hydraulic pressure) to reduce the torque capacity of the clutch, and the hydraulic pressure of a clutch for a low speed stage (engaged side hydraulic pressure) is increased by an upward corrective value at the time of the power-on but the clutch is kept in an unengaged state. In this state, the speed of rotation of the input shaft (turbine) continues decreasing toward a synchronization point of the low speed stage on the basis of the power-on state. The engine output is regulated at a constant opening of an electronic throttle regardless of loads, such as engine friction, the load of an air-conditioner, and electrical loads.

When the engine is powered on to increase the throttle opening immediately during a coast-down state in which the released side hydraulic pressure is decreased to release the clutch for the high speed stage and in which the increase of the engaged side hydraulic pressure has not reached an engaging pressure to leave the clutch for the low speed stage in a released state, the engine speed increases with the transmission system of the automatic transmission in a so-called free state, which can cause the engine to over-rotate. A shift shock can occur because the clutch for the low steed stage is engaged when the speed of rotation of the turbine has abruptly increased as a result of the over-rotation of the engine.

Even when the engine output is regulated as it is powered on to the constant throttle opening regardless of the loads, the absolute engine output becomes large if the actual loads are small to cause the engine to over-rotate. If the actual loads are great, the absolute engine output becomes small to cause a time lag because of a delay in synchronization.

For example, Japanese Patent Publication No. 59904/1995 has proposed an engine controller that detects the level of an increase in the number of rotations of a turbine during a downward shift and reduces an engine output when the level of the increase is equal to or greater than a predetermined value. However, this controller can be used only in a case in which the number of rotations of a turbine increases as a result of a downward shift and, when the engine is powered on in a coast-down state as described above, the rotation of the turbine reaches synchronization before the engaged side hydraulic pressure reaches an engaging pressure to cause the engine to over-rotate thereafter.

SUMMARY OF THE INVENTION (1) The invention provides an engine controller for a vehicle having an engine and an automatic transmission for transmitting the rotation of an output shaft of the engine to an input shaft of the automatic transmission through a fluidic transmission device, changing the speed of rotation by connecting and disconnecting a plurality of engaging elements (clutches, brakes, and one-way clutches) to switch the path of transmission, and transmitting the rotation whose speed has been changed to the driving wheels, the automatic transmission controlling the engine during a coast-down to a predetermined gear stage (e.g., from a fourth gear to a third gear) by engaging an engaging element (e.g., an engaging element C-1) while releasing a predetermined engaging element (e.g., an engaging element B-1), wherein it has an engine speed detection unit for detecting the number of rotations of the engine output shaft; an input shaft speed detection unit for detecting the number of rotations of the input shaft; a power-on detection unit for detecting a power-on state caused by a driver; an engine output control unit for controlling the output of the engine; and an engine control unit for detecting the engine speed and the input shaft speed and outputting a signal to the engine output control unit such that a predetermined relationship is maintained between the engine speed and the input shaft speed when the power-on state is detected in the coast-down state.

The term "engine" represents a concept that means a driving source, and is not limited to internal combustion engines, such as gasoline engines and diesel engines, but implies other driving sources, such as electric motors. The fluidic transmission device may be a torque converter or a fluid coupling. Referring to the automatic transmission, it is preferable to use an automatic transmission that provides a plurality of transmission stages by engaging and releasing an engaging element, such as a clutch, a brake, or a one-way clutch, to switch a transmission path of a planetary gear device or parallel shaft gear device. However, this is not limiting the invention, and the term "automatic transmission" represents a concept that covers also other automatic transmissions, such as a synchronous engagement type transmission, that is, a multi-stage transmission shifted by an expert system using an actuator, such as a hydraulic cylinder. The engaging elements are not limited to frictional engaging elements, such as clutches and brakes, and one-way clutches are also implied by this term. Therefore, the coast-down is not limited to switching of an engaged clutch, i.e., so-called clutch-to-clutch switching, and engagement of a low speed stage with a one-way clutch is also implied by this term.

(2) The invention also provides an engine controller according to the above, in which the engine control unit outputs the signal to the engine output control unit such that a difference between the engine speed and the input shaft speed becomes constant.

(3) The invention provides an engine controller according to the above, in which the engine control unit outputs a signal to the engine output control unit such that the ratio between the engine speed and the input shaft speed becomes constant.

(4) The invention also provides an engine controller according to any of the above, in which the engine output is controlled such that the engine speed is higher than the input shaft speed in the coast-down state.

(5) The invention also provides an engine controller according to (2) above, in which a correction is made to reduce an amount of signal output to the engine output control unit when the difference between the engine speed and the input shaft speed is increased.

(6) The invention also provides an engine controller according to (2) above, in which a correction is made to increase the amount of signal output to the engine output control unit when the difference between the engine speed and the input shaft speed is reduced.

(7) The invention also provides an engine controller according to any of (1) to (6) above, in which the engine is an internal combustion engine; the engine output control unit is an electronic throttle; and the signal is a required throttle opening.

(8) The invention also provides an engine controller according to (7) above, in which the required throttle opening during the coast-down is a basic throttle opening normally required when the accelerator is totally closed; and the required throttle opening is obtained by adding an amount of regulation determined based on the difference between the engine speed and the input shaft speed to the basic required opening when the power-on state is detected.

(9) The invention also provides an engine controller according to (7) above, in which, when the required throttle opening is greater than the basic throttle opening normally required when the accelerator is totally closed, the required throttle opening, when the power-on state is detected, is obtained by adding an amount of regulation determined based on the difference between the engine speed and the input shaft speed that are based on the basic required throttle opening to the basic required throttle opening.

(10) The invention also provides an engine controller according to (7) above, in which when the required throttle opening is greater than the basic throttle opening normally required when the accelerator is totally closed and when there are great loads other than the vehicle load, the required throttle opening when the power-on state is detected is obtained by adding an amount of regulation determined based on the difference between the engine speed and the input shaft speed that are based on the basic required throttle opening to the required throttle opening that is greater than the basic required throttle opening.

(11) The invention also provides an engine controller according to any of (1) to (10) above, in which the engine control unit maintains the signal based on the engine speed and the input shaft speed until the input shaft speed is synchronized with the predetermined transmission stage (until a low gear synchronization point); and the engine output control unit sweeps up the same until it agrees with a throttle opening required by the driver.

According to (1) above, because the engine output is controlled such that a constant relationship is maintained between the engine speed and the input shaft speed when switching to the power-on state occurs during a coast-down, the over-rotation of the engine (over-rotation of the driving source) is prevented even when the automatic transmission is in a substantially free state, and a gear change can be smoothly made with a reduced shift shock and delay after the engaging element for the low speed stage is engaged.

According to (2) above, an engine can be controlled with high precision and reliability because an absolute engine output that is the total engine output minus an engine output based on the vehicle loads when the accelerator is totally closed, i.e., engine friction, electrical loads, and the load of an air-conditioner is accurately detected from the difference between the engine speed and the input shaft speed and because the engine output in the power-on state is regulated based on the absolute engine output.

According to (3) above, an engine can be controlled also based on the ratio between the engine speed and the input shaft speed.

According to (4) above, control is performed to keep the engine speed higher than the input shaft speed even during a coast-down, which allows a smooth transfer to engine control in the power-on state to prevent the over-rotation of the engine and a shift shock while preventing a shock attributable to switching between reverse driving and forward driving (tip-in).

According to (5) above, although an engine is likely to over-rotate when there is a great difference between the engine speed and the input shaft speed because of idle rotation, a correction is made to reduce the amount of operation of the engine output control unit, thereby making it possible to prevent the engine from over-rotating.

According to (6) above, although a gear change is likely to take time when the difference between the engine speed and the input shaft speed is small for causes that include great loads other than vehicle loads, such as the load of an air-conditioner, the amount of operation of the engine output control unit can be corrected to be large to prevent the occurrence of such a slow gear change.

According to (7) above, engine control can be properly performed in response to switching to the power-on state during a coast-down using an existing internal combustion engine and electronic throttle.

According to (8) above, an engine output is controlled by adding an amount of regulation determined by an absolute engine output based on the difference between the engine speed and the turbine speed to a basic throttle opening normally required when the accelerator is totally closed using an idling speed controller (ISC). This makes it possible to control an engine with high precision when switching to the power-on state occurs during a coast-down.

According to (9) above, an engine can be properly controlled without over-rotation using a proper required throttle opening when the throttle opening is greater than the normal basic required throttle opening as a result of idle rotation.

According to (10) above, an engine can be controlled based on a required throttle opening associated with idle rotation to prevent a slow gear change when there are great loads other than vehicle loads, such as a torque converter, even during idle rotation.

According to (11) above, the engine control based on the engine speed and the input shaft speed is maintained until a synchronization point of a low speed gear and swept up toward a throttle opening required by the driver, which allows a smooth downward shift to a low speed stage without causing the engine to over-rotate.

BRIEF DESCRIPTION OF THE DRAWINGS

The invention will be described with reference to the drawings, in which.

DETAILED DESCRIPTION OF PREFERRED EMBODIMENTS

Figures 1, 2:
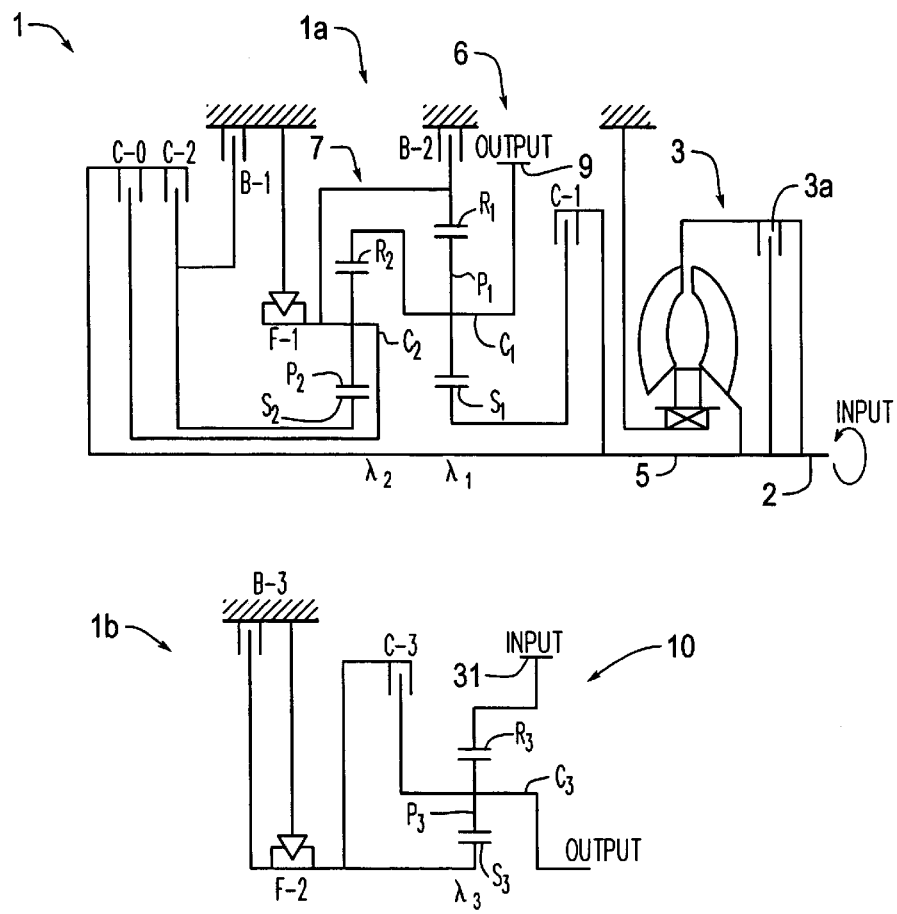
FIG. 1 is a schematic diagram of an automatic transmission to which the invention can be applied.
FIG. 2 is an operation table of the automatic transmission of FIG. 1.

A preferred embodiment of the invention will now be described with reference to the drawings. FIG. 1 is a schematic diagram of an automatic transmission in which the invention is preferably embodied. An automatic transmission 1 has a four-speed main transmission section 1a provided coaxially with an engine output shaft 2 and a sub-transmission section 1b constituted by an under drive. The four-speed main transmission section 1a transmits the output of the engine output shaft 2 to an input shaft 5 through a torque converter 3 having a lock-up clutch 3a and has first and second planetary gears 6, 7 comprising simple planetary gears. In the planetary gears 6, 7, a first ring gear $R_1$ and a second carrier $C_2$ are coupled; a first carrier $C_1$ and a second ring gear $R_2$ are coupled; and the second ring gear $R_2$ and the first carrier $C_1$ coupled with each other are coupled with a counter drive gear 9 that is an output member of the main transmission section 1a.

A first clutch C-1, a second clutch C-2, and a fourth clutch C-0 are interposed between the input shaft 5 and a first sun gear $S_1$, between the input shaft 5 and a second sun gear $S_2$, and between the input shaft 5 and the second carrier $C_2$, respectively. The second sun gear $S_2$ is anchored by a first brake B-1, and the second carrier $C_2$ and the first ring gear $R_1$, coupled with each other, are anchored by a second brake B-2 and a first one-way clutch F-1.

The sub-transmission section 1b has one simple planetary gear 10. A ring gear $R_3$ of the same is coupled with a counter driven gear 31 that is engaged with the counter drive gear 9 to serve as an input member, and a carrier $C_3$ is coupled with an output section to transmit power to left and right driving wheels through differential gears. A third clutch C-3 is interposed between the carrier $C_3$ and a sun gear $S_3$, and the sun gear $S_3$ is anchored by a third brake B-3 and a second one-way clutch F-2.

The automatic transmission 1 achieves five forward (first, second, third, fourth, and fifth) speeds and one reverse speed (REV) as a result of operations of the clutches C-0, C-1, C-2, and C-3, the brakes B-1, B-2, and B-3, and the one-way clutches F-1 and F-2, as shown in the operation table of FIG. 2. In FIG. 2, a symbol "O" indicates an operating (engaged) state of each of the clutches, brakes, and one-way clutches; a blank in the table indicates a non-operating (released) state; and a symbol "O" in brackets indicates a state in which the element is operated for engagement when an engine brake is operated.

Figure 3:
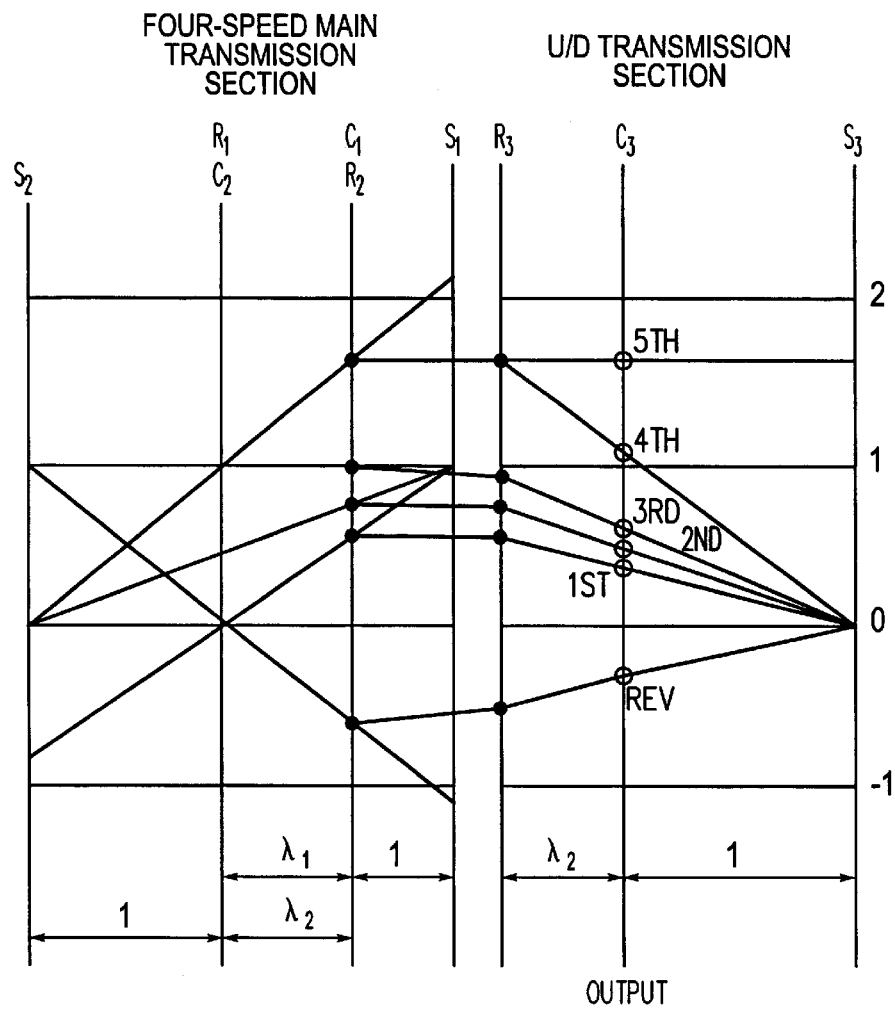
FIG. 3 is a speed diagram of the automatic transmission of FIG. 1.

FIG. 3 is a speed diagram of the automatic transmission 1 in which the position of each planetary gear, shown in FIG. 1, using a coordinate system set by gear ratios $\lambda_1$, $\lambda_2$, and $\lambda_3$ of the gear as shown on the abscissa axis and in which speeds of the gears are shown on the ordinate axis where the speed of rotation of the input member is represented by 1. Therefore, each gear of the four-speed main transmission section located at "1" on the ordinate axis is coupled with the input shaft to serve as an input section; each gear located at "0" is anchored by a brake or one-way clutch; the first carrier $C_1$ and the second ring gear $R_2$ coupled with each other serve as an output section of the four-speed main transmission section; the rotation of the output section is coupled to the third ring gear $R_3$ that serves as an input section of the sub-transmission section 1b; and rotations at the five forward speeds and one reverse speed are output from the third carrier $C_3$.

Figure 4:
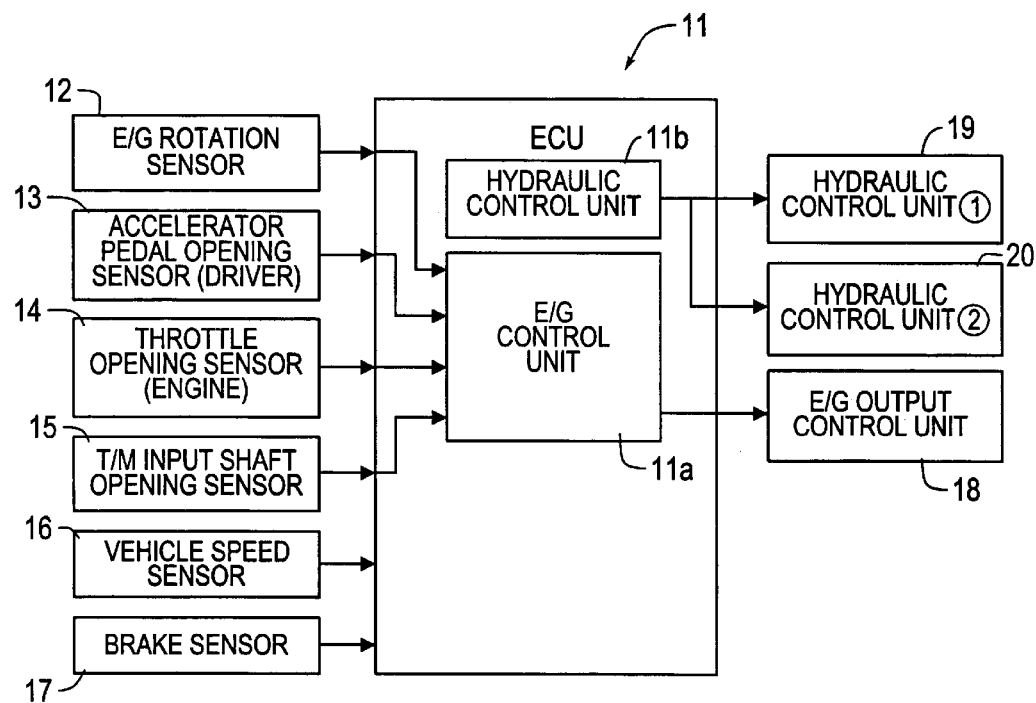
FIG. 4 is a block diagram of an electronic control section according to the invention.

FIG. 4 is a block diagram showing an electrical control system. Reference numeral 11 represents a control section (ECU) comprising a microcomputer to which signals are input from an engine (E/G) rotation sensor 12, an acceleration pedal (operation) opening sensor 13 for detecting the pressure applied (operation) to an acceleration pedal by a driver, a sensor 14 for detecting the opening of an actual engine throttle, a sensor 15 for detecting the speed (turbine speed) of an input shaft of a transmission (automatic transmission), a vehicle speed (speed of an output shaft of the automatic transmission) sensor 16, and a brake sensor 17 for detecting a driver's operation of a foot brake. The control section 11 provides outputs to an engine control unit (an electronic throttle system) 18 for controlling the output of the engine and linear solenoid valves 19, 20 (a hydraulic control unit <1> and a hydraulic control unit <2>) of a hydraulic circuit. The control section 11 has a hydraulic control unit 11b for transmitting a pressure adjustment signal to the hydraulic control units 19, 20, comprising linear solenoid valves, and an engine control unit 11a for transmitting a requested throttle opening (signal) to the engine output control unit comprised of an electronic throttle system. An engine control unit 11a detects the engine speed and the speed of the input shaft in a coast-down state and outputs a signal to the engine output control unit 18 such that a predetermined constant relationship (e.g., a difference) is maintained between the engine speed and the input shaft speed when the power-on state is detected.

The amount of operation of the acceleration pedal is detected by the acceleration pedal opening sensor 13. The acceleration pedal is operated by the driver in accordance with a desired, or required, by the operator amount of output, and it corresponds to an acceleration operation member. The amount of operation of the acceleration pedal corresponds to the operator required amount of output. The electronic throttle valve (engine output control unit) 18, which is opened by a throttle actuator at an angle (opening) in accordance with the amount of operation of the acceleration pedal, is provided in a suction pipe of the engine. An ISC (idling speed control) valve for controlling the amount of suction when the electronic throttle valve is totally closed is provided in a bypass channel that bypasses the electronic throttle valve for controlling the speed of idle rotation.

Figure 5:
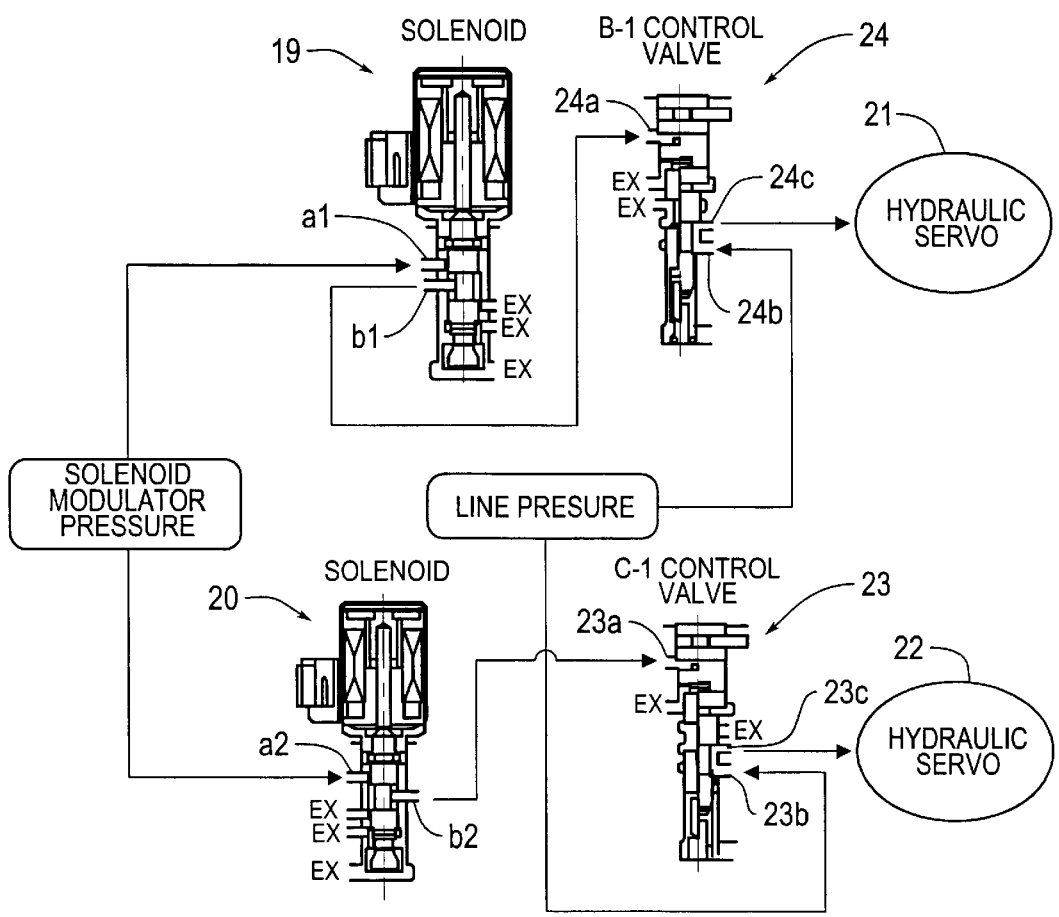
FIG. 5 schematically shows a hydraulic circuit used in the invention.

FIG. 5 schematically shows the hydraulic circuit which has the two linear solenoid valves 19, 20 that constitute the hydraulic control units <1>, <2> and hydraulic servos for a plurality of frictional engaging elements (clutches and brakes), such as hydraulic servos 21, 22, for causing connection and disconnection of the first brake (frictional engaging element for a high speed stage) B-1 that is engaged at a fourth speed and released at a third speed and the first clutch (frictional engaging element for a low speed stage) C-1 that is engaged at the third speed and released at the fourth speed. A solenoid modulator pressure is supplied to input ports $a_1$ and $a_2$ of the linear solenoid valves 19, 20, and controlled hydraulic pressures from output ports $b_1$, $b_2$ of the linear solenoid valves 19, 20 are supplied to control oil chambers 24a, 23a of respective pressure control valves (e.g., a B-1 control valve and a C-1 control valve) 24, 23. Line pressures are supplied to input ports 24b, 23b of the respective pressure control valves 24, 23, and adjusted pressures from output ports 24c, 23c that have been adjusted with the control oil pressure are supplied to the hydraulic servos 21, 22 respectively as the occasion demands.

The hydraulic circuit is shown to indicate a basic concept, and oil pressures to the hydraulic servos 21, 22 are supplied through predetermined respective shift valves. The elements are described as examples only and, in practice, a multiplicity of hydraulic servos are provided in association with an automatic transmission along with a multiplicity of shift valves for switching oil pressures to be supplied to the hydraulic servos.

The engine controller, that is a major part of the invention, will now be described with reference to the flow chart in FIG. 6 and the time chart in FIG. 7. When a downward shift, such as a shift from the fourth gear to the third gear, is commanded from the control section 11 as a result of a reduction in the vehicle speed in a power-off (acceleration off) state at the time of a coast-down, such as a braking operation (brake on) of the driver or inertial traveling, the oil pressure (hereinafter referred to as "released side clutch pressure") PA of the hydraulic servo 21 for the frictional engaging element for the high speed stage (frictional engaging elements including brakes are hereinafter referred to as "clutches") B-1 starts sweeping down with a relatively steep slope δPA1 (coast-down transmission output). The released side clutch pressure PA sweeps down to a standby pressure PA2, that is, an oil pressure developing immediately before frictional plates of the clutches contact each other to produce a torque capacity. The released side clutch pressure PA then sweeps down with a slope δPA3 that is gentler than the slope δPA1 to slip the clutch B-1. The clutch pressures PA and PB shown in FIG. 7 schematically represent oil pressures of actual hydraulic servos.

The oil pressure PB of the hydraulic servo 22 for the clutch C-1 for the low speed stage (hereinafter referred to as "engaged side clutch pressure") rises with a delay from the released side clutch pressure PA and increases to a servo activation pressure PB1 at which frictional plates of the clutches move in contact with each other. The clutch C-1 for the low speed stage is kept in a released state (in which it has no torque capacity) at the servo activation pressure.

During the coast-down, the electronic throttle opening θT is in a closed state and the engine speed NE is low because the driver steps off the acceleration pedal. The turbine (input shaft) speed NT is low because of the deceleration of the wheels and the reduction of the engine speed. In general, because the driving relationship is reversed (driving wheels drive the engine) during coasting, the turbine speed NT is higher than the engine speed. In the present embodiment, however, the engine speed NE is controlled such that it is always higher than the turbine speed NT by controlling the engine output (electronic throttle). This prevents a shock or a so-called tip-in that otherwise occurs when forward driving (the engine drives the driving wheels) is enabled as a result of switching to a power-on state during the coast-down in the reverse driving relationship.

In the coast-down state, the difference between the engine speed and the turbine speed (NE−NT) is updated and stored. The difference (NE−NT) is the amount of slip of a torque converter, and it is a vehicle load or an engine output. The engine output is based on a vehicle load, that is, a value obtained by subtracting engine friction when the accelerator is totally closed (a new engine and an engine that has been subjected to running in have different frictions), an electrical load (generator load), and an air-conditioner load (compressor load), from an actual total engine output. The difference (NE−NT) is an absolute engine output.

The turbine speed NT is low because of a reduction of the vehicle speed attributable to the gear ratio of the high speed stage (fourth speed) when the released side clutch pressure PA is higher than the standby pressure PA2 to maintain an engaging force. During the sweep-down δPA3 that occurs after the standby pressure PA2, the turbine speed is reduced because of the addition of the engine speed that has been controlled using a slip of the clutch B-1 for the high speed state. The amount of regulation θD of the engine control at the time of power-on is determined by the absolute engine output (NE−NT) stored when the torque capacity of the clutch for the high speed stage increases beyond the absolute engine output to cause a change of the turbine speed NT or when a transition from a torque phase to an inertial phase occurs.

During the execution of the above-described coasting down (S1 in FIG. 6), when the driver steps on the acceleration pedal to enter the power-on state (the sensor 13 judges that the acceleration pedal opening is θ0) (S2), an electronic throttle opening (actual throttle opening detected by the sensor 14) θT is set such that it equals a value θT1 that is the basic throttle opening θI normally required when the accelerator is totally closed (a required throttle opening: a required throttle opening will be hereinafter simply referred to as "a throttle opening") plus the amount of regulation θD determined based on the stored difference (NE−NT) between the engine speed NE and turbine speed NT (S3). The normal basic throttle opening θI is a required electronic throttle opening in an power-off state achieved by the idling speed controller (ISC) and is preset such that the engine speed NE becomes 600 rpm, for example.

As described above, due to switching to the power-on state, the throttle opening θT is greater than the normal basic throttle opening θI during the coast-down by the amount of regulation θD determined based on the stored difference (NE−NT), i.e., (θT1=θI+θD), and the engine speed NE increases accordingly. The amount of regulation θD is set based on the absolute engine output (NE−NT) during the coast-down, and the turbine speed after the power-on is therefore kept such that the difference (NE−NT) between the engine speed NE and the turbine speed NT is maintained or such that the turbine speed NT increases substantially in parallel with the engine speed NE. While the required electronic throttle opening θT1 is kept at the constant value (θI+θD), determined as described above in the present embodiment, feedback control of the turbine speed NT may be carried out such that the difference (NE−NT) will be constant (S4). This makes it possible to perform control such that the same engine output is always obtained during a gear change (from the fourth gear to the third gear) in the power-on state.

In the gear change in the power-on state, the released side clutch pressure PA continues sweeping down with the slope δPA3, and the clutch B-1 for the high speed stage stays in a released state with the torque capacity thereof continuing to decrease. The engaging clutch pressure PB increases by a predetermined amount b as a result of the switching to the power-on state to reach a predetermined oil pressure PB2, but the clutch C-1 for the low speed stage has not been engaged yet at the oil pressure PB2.

When the turbine speed NT is synchronized with a calculated synchronized turbine speed NTL of the gear at the low speed stage (low gear stage synchronization point), indicated by the dotted line in FIG. 7 (S5), the electronic throttle opening θT sweeps up with a predetermined slope δθT, and the sweep-up continues until the opening agrees with the acceleration pedal opening θ0 required by the driver. Thereafter, the engine control of the present embodiment is stopped to return the electronic throttle opening θT to normal control that is carried out based on the acceleration pedal opening θ0 (S6).

The engaged side clutch pressure PB sweeps up from the low speed gear stage synchronization point with sequentially increasing slopes δPB3, δPB4, and δPB5, and the torque capacity of the clutch C-1 for the low speed stage smoothly and relatively quickly increases, which puts the clutch in a completely engaged state to switch the automatic transmission to the low speed stage (fourth speed).

While the invention is preferably used for engine control performed to increase the engine speed NE beyond the turbine speed NT during a coast-down, the invention is not limited to the same and may be used in cases wherein an engine E/G, is not controlled as described above during the coast-down and wherein the turbine speed NT becomes higher than the engine speed NE. Although the engine E/G is preferably controlled based on an absolute engine output (NT−NE when NE<NT) that is a difference between the engine speed NE and the turbine speed NT at the time of switching to a power-on state as described above, the control of an electronic throttle opening θT is not limited to the use of such a difference and may be carried out based on the ratio between the engine speed NE and the turbine speed NT such that a predetermined relationship is maintained between the engine speed and the turbine speed.

Figure 7:
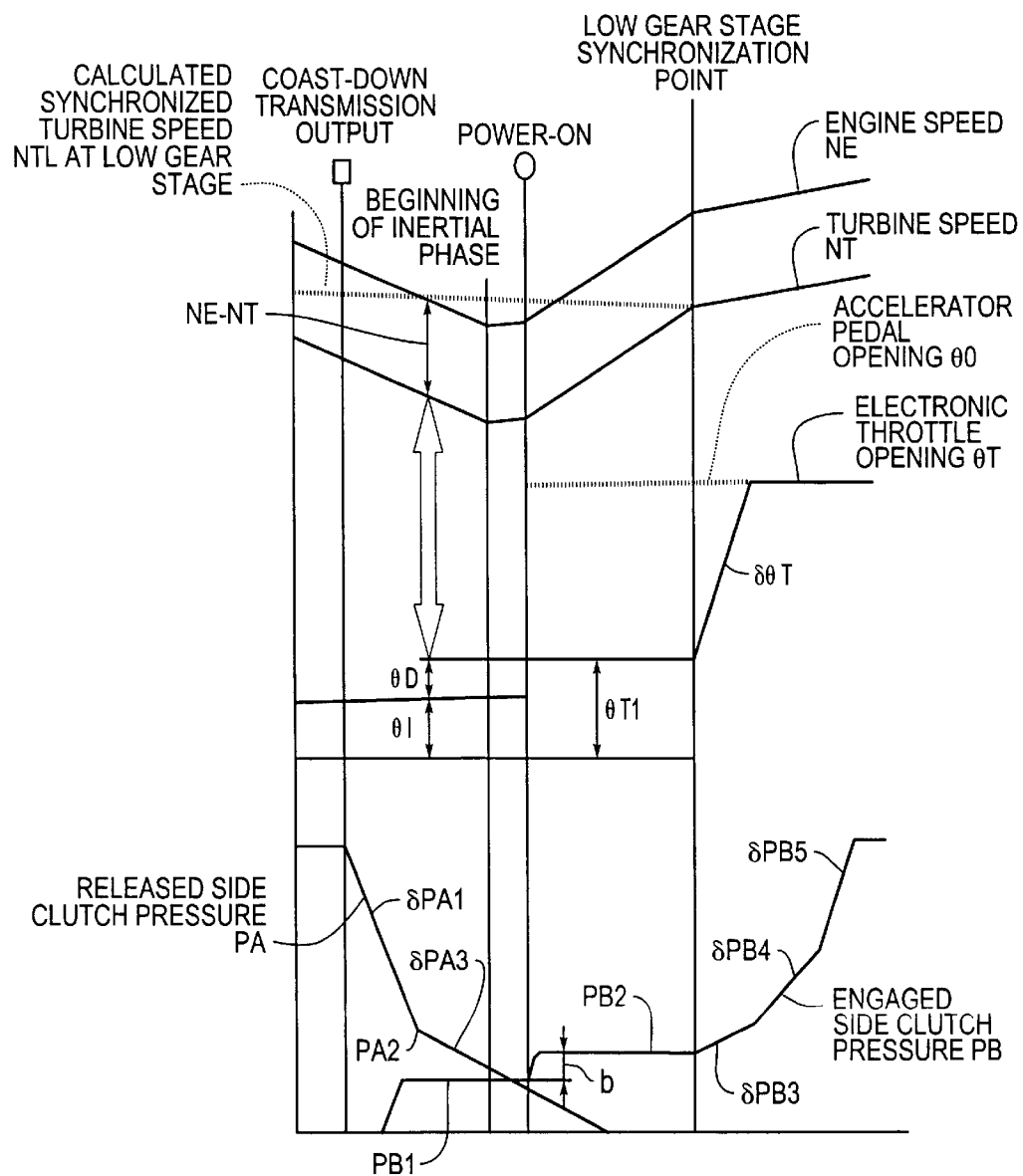
FIG. 7 is a time chart in the case of a normal basic throttle opening when an accelerator is totally closed.
Figure 8:
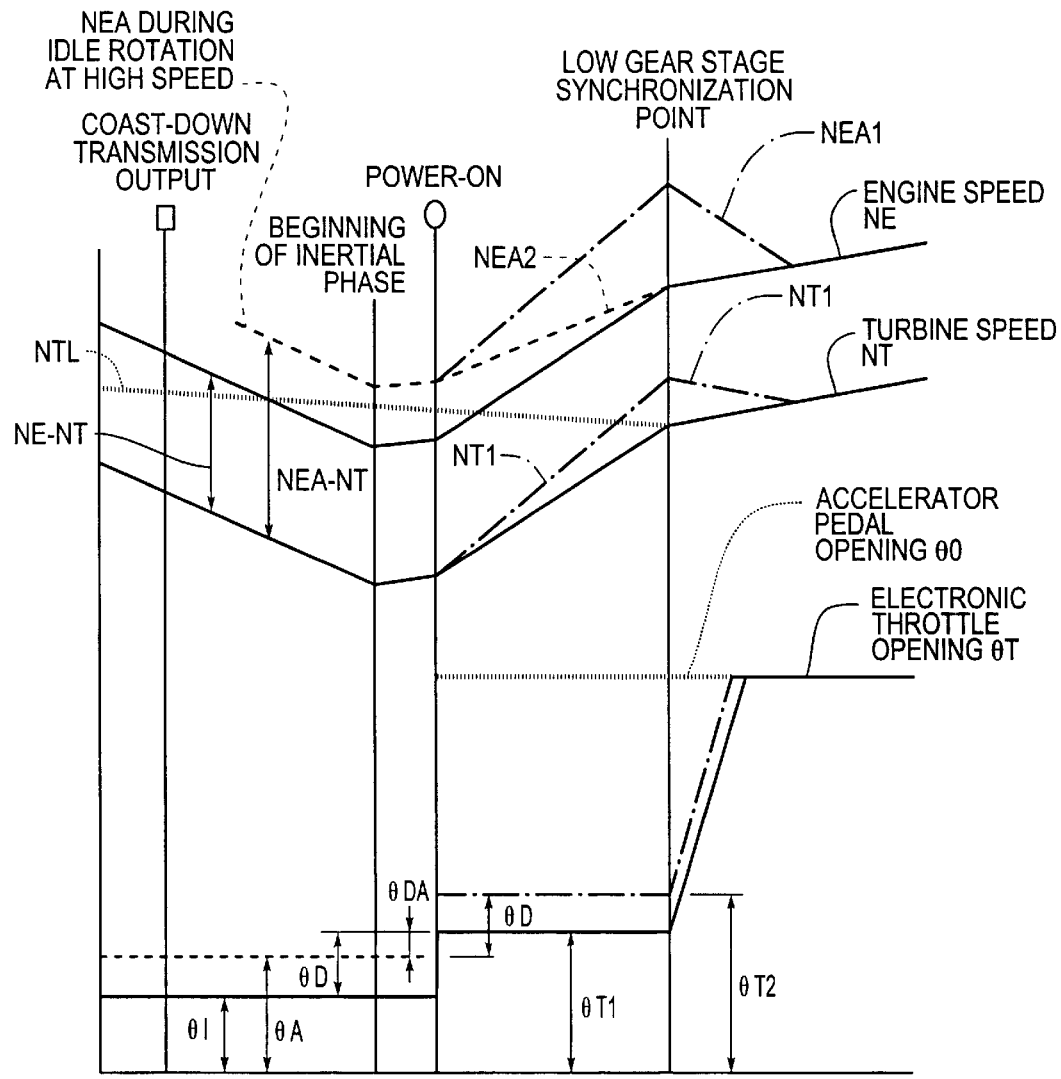
FIG. 8 is a time chart in the case of idle rotation when the accelerator is totally closed.

A description will now be made, with reference to FIG. 8, of a case in which an absolute engine output is greater than a normal output, as shown in FIG. 7, during a coast-down, such as idle rotation. In a vehicle that employs the present engine controller 11, an idling speed controller (ISC) is used, and the state of the engine E/G is detected to control the electronic throttle opening θT such that the idling speed agrees with a target speed (e.g., 1000 rpm). When the vehicle is driven to cause switching to a power-on state during a coast-down in an idling state at a speed higher than the normal state (in a state that comes shortly after the starting of the engine), an electronic throttle opening θA (see the broken line) during the coast-down (the power is off) is greater than the normal basic throttle opening θI shown in FIG. 7 by a predetermined amount, and an engine speed NEA is therefore also higher than the normal speed as indicated by the broken line. When engine control is carried out in this state using the normal amount of regulation θD (see θT2 indicated by the alternate long and short dash line) determined based on the absolute engine output, that is, a difference (NEA−NT) between the engine speed NEA and turbine speed NT at the time of switching to the power-on state, the engine output becomes too large, and an engine speed NEA1 and a turbine speed NT1 increase as indicated by the alternate long and short dash lines to cause over-rotation of the engine in the vicinity of a low gear stage synchronization point.

In the present embodiment, engine control is performed with a correction made to ignore the increase in the idling speed provided by the ISC. Specifically, an amount of regulation (required throttle opening) θDA, based on the difference (NEA−NT) between the engine speed NEA and the turbine speed NT, is corrected such that it becomes smaller than the normal amount of regulation θD (see S3). The corrected amount of regulation θDA is set equal to a value that is the normal basic throttle opening θI when the accelerator is totally closed, as shown in FIG. 7, plus the amount of regulation θD determined based on the difference (NE−NT) between the engine speed NE at the normal accelerator opening and the turbine speed NT (θT1=θI+θD=θA+θDA).

Thus, the electronic throttle opening θTI in the power-on state is substantially equal to that achieved by normal engine control, and an engine speed NEA2 smoothly increases such that the turbine speed NT is synchronized at the low gear stage synchronization point as indicated by the broken line, which prevents over-rotation of the engine.

Figure 9:
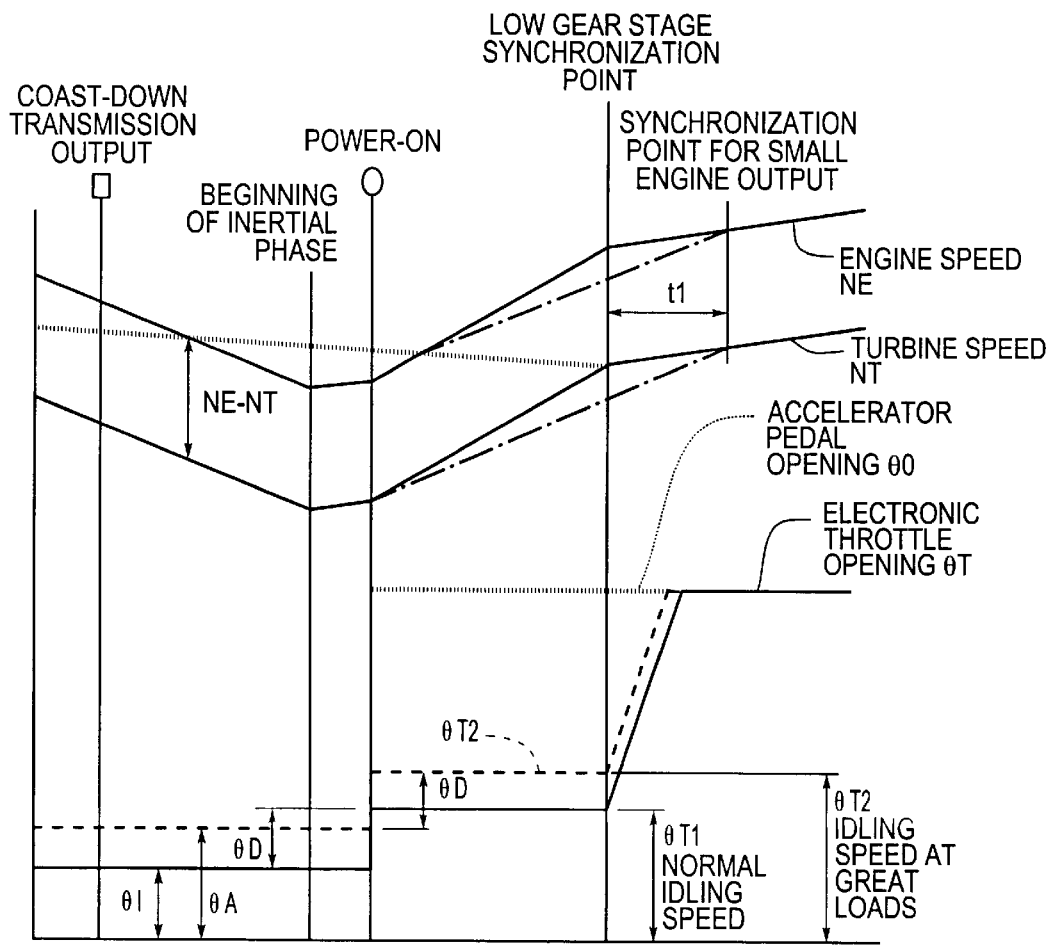
FIG. 9 is a time chart in the case where there are great loads other than vehicle loads, such as a torque converter, during idle rotation.

A description will now be made with reference to FIG. 9 of a case in which there are great loads, such as an air-conditioner load, an electrical load, and engine friction during idle rotation. When engine control is carried out at the time of power-on using the throttle opening θT1 (=θI+θD) that is the normal basic throttle opening θI plus the amount of regulation θD determined based on the normal difference (NE−NT), as in the case of idle rotation shown in FIG. 8, because there are great loads, other than the vehicle load as described above, the engine speed NE decreases, which makes the difference (NE−NT) between the engine speed and the turbine speed small. Further, because the output characteristics of the engine are insufficient during idle rotation immediately after the starting of the engine output becomes small as indicated by the alternate long and short dash line when the required throttle opening (see the solid line) during the normal idle rotation is used. This results in an insufficient increase of the engine speed NE and results in a delay in the increase in the turbine speed NT indicated by the solid line from the low gear stage synchronization point. This results in low gear change with a great time lag (hesitation) t1.

In the present embodiment, as described above, when there are great loads and the absolute engine output (NE−NT) is small, the electronic throttle opening θT is set at a value θT2 (see broken line) that is the idling speed θA plus the normal amount of regulation θD determined based on the difference (NE−NT) between the engine speed NE and the turbine speed NT.

Figure 6:
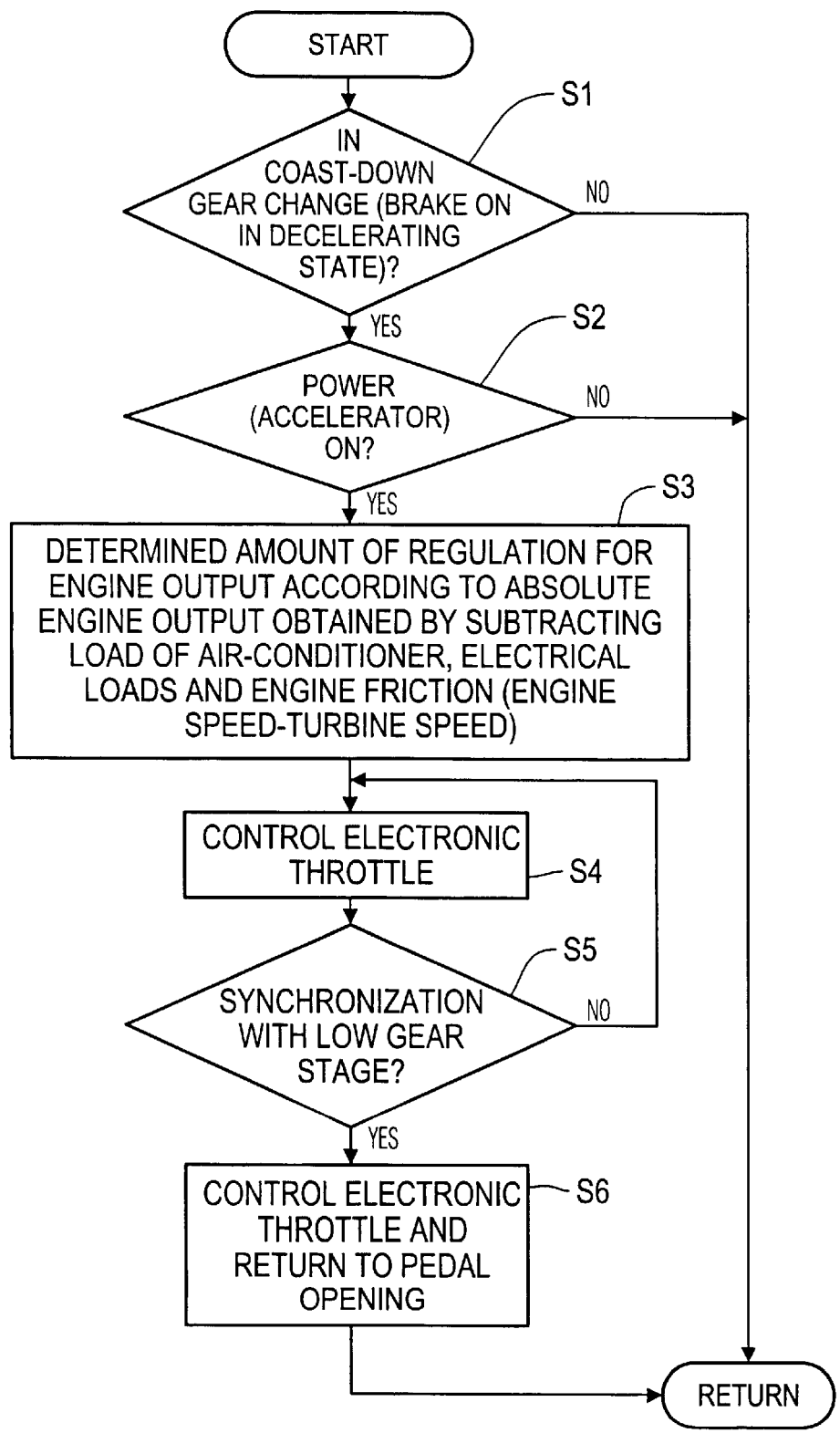
FIG. 6 is a flow chart of engine control according to the invention.

As described, in the case of a small absolute engine output, the engine can be controlled to allow a gear change at appropriate timing while preventing a slow gear change as described above by increasing the electronic throttle opening (see S3, FIG. 6).

The engine control according to the invention is not limited to a downward shift from the fourth speed to the third speed and may be used for other downward shifts. Further, the invention is not limited to the automatic transmission as shown in FIGS. 1 to 3 and may be similarly used for other automatic transmissions.

What is claimed is:

1. An engine controller for a vehicle having an engine and an automatic transmission for transmitting the rotation of an output shaft of the engine to an input shaft through a fluidic transmission device, changing the speed of rotation by switching the transmission path, and transmitting the rotation whose speed has been changed to driving wheels, the automatic transmission controlling the engine during a coast-down to a predetermined gear stage, the engine controller comprising:

an engine speed detection unit for detecting the number of rotations of the engine output shaft;

an input shaft speed detection unit for detecting the number of rotations of the input shaft;

a power-on detection unit for detecting a power-on state caused by a driver;

an engine output control unit for controlling the output of the engine; and an engine control unit for determining an engine speed and an input shaft speed and outputting a signal to the engine output control unit such that a predetermined relationship is maintained between the engine speed and the input shaft speed when the power-on state is detected in the coast-down state.

2. The engine controller according to claim 1, wherein the engine control unit outputs the signal to the engine output control unit such that a difference between the engine speed and the input shaft speed becomes constant.

3. The engine controller according to claim 1, wherein the engine control unit outputs a signal to the engine output control unit such that the ratio between the engine speed and the input shaft speed becomes constant.

4. The engine controller according to claim 1, wherein the engine output is controlled such that the engine speed is higher than the input shaft speed in the coast-down state.

5. The engine controller according to claim 2, wherein a correction is made to reduce an amount of signal output to the engine output control unit when the difference between the engine speed and the input shaft speed is increased.

6. The engine controller according to claim 2, wherein a correction is made to increase an amount of signal output to the engine output control unit when the difference between the engine speed and the input shaft speed is reduced.

7. The engine controller according to claim 1, wherein the engine is an internal combustion engine, the engine output control unit is an electronic throttle, and the signal is a required throttle opening.

8. The engine controller according to claim 7, wherein the required throttle opening during the coast-down is a basic throttle opening normally required when an accelerator is totally closed, and the required throttle opening is obtained by adding an amount of regulation determined based on the difference between the engine speed and the input shaft speed to the basic required opening when the power-on state is detected.

9. The engine controller according to claim 7, wherein when the required throttle opening is greater than a basic throttle opening normally required when an accelerator is totally closed, the required throttle opening when the power-on state is detected is obtained by adding an amount of regulation determined based on the difference between the engine speed and the input shaft speed, that are based on the basic required throttle opening, to the basic required throttle opening.

10. The engine controller according to claim 7, wherein when the required throttle opening is greater than a basic throttle opening normally required when an accelerator is totally closed and when loads other than a vehicle load are increased, the required throttle opening when the power-on state is detected is obtained by adding an amount of regulation determined based on the difference between the engine speed and the input shaft speed, that are based on the basic required throttle opening, to the required throttle opening that is greater than the basic required throttle opening.

11. The engine controller according to claim 1, wherein the engine control unit maintains the signal based on the engine speed and the input shaft speed until the input shaft speed is synchronized with a predetermined transmission stage, and the engine output control unit sweeps up the signal until it agrees with a throttle opening required by the driver.

12. An engine control method for a vehicle having an engine and an automatic transmission for transmitting the rotation of an output shaft of the engine to an input shaft through a fluidic transmission device, changing the speed of rotation by switching the transmission path, and transmitting the rotation whose speed has been changed to driving wheels, the automatic transmission controlling the engine during a coast-down to a predetermined gear stage, the method comprising:

controlling the output of the engine; and determining a power-on state of the engine, an engine speed, and an input shaft speed based on signal inputs providing the number of rotations of the engine output shaft, the number of rotations of the input shaft; and power-on state of the engine; and outputting a signal to control the output of the engine such that a predetermined relationship is maintained between the engine speed and the input shaft speed when the power-on state is detected in the coast-down state.

13. The engine control method according to claim 12, wherein the output signal to control the output of the engine is such that a difference between the engine speed and the input shaft speed becomes constant.

14. The engine control method according to claim 12, wherein the output signal to control the output of the engine is such that the ratio between the engine speed and the input shaft speed becomes constant.

15. The engine control method according to claim 12, wherein the control of the output of the engine is such that the engine speed is higher than the input shaft speed in the coast-down state.

16. The engine control method according to claim 13, further comprising reducing an amount of signal output to control the output of the engine when the difference between the engine speed and the input shaft speed is increased.

17. The engine control method according to claim 13, further comprising increasing an amount of signal output to control the output of the engine when the difference between the engine speed and the input shaft speed is reduced.

18. The engine control method according to claim 12, wherein the power-on state of the engine signal is a required throttle opening.

19. The engine control method according to claim 18, wherein the required throttle opening during the coast-down is a basic throttle opening normally required when an accelerator is totally closed, and the required throttle opening is obtained by adding an amount of regulation determined based on the difference between the engine speed and the input shaft speed to the basic required opening when the power-on state is detected.

20. The engine control method according to claim 18, wherein when the required throttle opening is greater than a basic throttle opening normally required when an accelerator is totally closed, the required throttle opening when the power-on state is detected is obtained by adding an amount of regulation determined based on the difference between the engine speed and the input shaft speed, that are based on the basic required throttle opening, to the basic required throttle opening.

21. The engine control according to claim 18, wherein when the required throttle opening is greater than a basic throttle opening normally required when an accelerator is totally closed and when loads other than a vehicle load are increased, the required throttle opening when the power-on state is detected is obtained by adding an amount of regulation determined based on the difference between the engine speed and the input shaft speed, that are based on the basic required throttle opening, to the required throttle opening that is greater than the basic required throttle opening.

22. The engine controller according to claim 12, further comprising maintaining the amount of signal output to control the output of the engine based on the engine speed and the input shaft speed until the input shaft speed is synchronized with a predetermined transmission stage, and the amount of signal output to control the output of the engine sweeps up the amount of signal output until it agrees with a throttle opening required by the driver.

23. A recording medium storing programs for engine control for a vehicle having an engine and an automatic transmission for transmitting the rotation of an output shaft of the engine to an input shaft through a fluidic transmission device, changing the speed of rotation by switching the transmission path, and transmitting the rotation whose speed has been changed to driving wheels, the automatic transmission controlling the engine during a coast-down to a predetermined gear stage, the programs comprising:

a program for controlling the output of the engine; and a program for determining a power-on state of the engine, an engine speed, and an input shaft speed based on signal inputs providing the number of rotations of the engine output shaft, the number of rotations of the input shaft; and power-on state of the engine; and a program for outputting a signal to control the output of the engine such that a predetermined relationship is maintained between the engine speed and the input shaft speed when the power-on state is detected in the coast-down state.

24. The recording medium according to claim 23, wherein the program outputting a signal outputs the signal to control the output of the engine such that a difference between the engine speed and the input shaft speed becomes constant.

25. The recording medium according to claim 23, wherein the program outputting a signal outputs the signal to control the output of the engine such that the ratio between the engine speed and the input shaft speed becomes constant.

26. The recording medium method according to claim 23, wherein the program outputting a signal that controls of the output of the engine is such that the engine speed is higher than the input shaft speed in the coast-down state.

27. The recording medium according to claim 24, further comprises a program for reducing an amount of signal output to control the output of the engine when the difference between the engine speed and the input shaft speed is increased.

28. The recording medium according to claim 24, further comprises a program for increasing an amount of signal output to control the output of the engine when the difference between the engine speed and the input shaft speed is reduced.

29. The recording medium according to claim 23, wherein the power-on state of the engine signal is a required throttle opening used by the program for determining.

30. The recording medium according to claim 29, wherein the required throttle opening during the coast-down is a basic throttle opening normally required when an accelerator is totally closed, and further comprising a program that obtains the required throttle opening by adding an amount of regulation determined based on the difference between the engine speed and the input shaft speed to the basic required opening when the power-on state is detected.

31. The recording medium according to claim 29, further comprising a program for determining when the required throttle opening is greater than a basic throttle opening normally required when an accelerator is totally closed, the required throttle opening when the power-on state is detected by adding an amount of regulation determined based on the difference between the engine speed and the input shaft speed, that are based on the basic required throttle opening, to the basic required throttle opening.

32. The recording medium according to claim 29, further comprising a program for determining, when the required throttle opening is greater than a basic throttle opening normally required when an accelerator is totally closed and when loads other than a vehicle load are increased, the required throttle opening when the power-on state is detected by adding an amount of regulation determined based on the difference between the engine speed and the input shaft speed, that are based on the basic required throttle opening, to the required throttle opening that is greater than the basic required throttle opening.

33. The recording medium according to claim 12, further comprising a program for maintaining the amount of signal output to control the output of the engine based on the engine speed and the input shaft speed until the input shaft speed is synchronized with a predetermined transmission stage, and the amount of signal output to control the output of the engine sweeps up the amount of signal output until it agrees with a throttle opening required by the driver.

* * * * *